United States Patent [19]
Morton

[11] 4,351,438
[45] Sep. 28, 1982

[54] APPARATUS FOR ANALYZING A FISH POPULATION
[76] Inventor: Kenneth E. Morton, 141 SW. 15th #30, Bend, Oreg. 97701
[21] Appl. No.: 224,056
[22] Filed: Jan. 12, 1981
[51] Int. Cl.³ .................. B07B 13/05; A01K 61/00
[52] U.S. Cl. ........................... 209/675; 119/3; 209/906
[58] Field of Search .............. 119/3; 209/675, 906
[56] References Cited

U.S. PATENT DOCUMENTS 3,804,063  4/1974  Finger ............................ 119/3
3,870,018  3/1975  Fruchtnicht .................... 119/3
4,095,092  6/1978  Neff .............................. 119/3 X

FOREIGN PATENT DOCUMENTS 1131939  6/1962  Fed. Rep. of Germany ......... 119/3

Primary Examiner—Hugh R. Chamblee
Attorney, Agent, or Firm—Kolisch, Hartwell & Dickinson

[57] ABSTRACT

Apparatus for analyzing a fish population. The apparatus includes an elevated tank which receives fish transferred from a pond. Fish travel from this tank and by gravity through a fish grader which separates the fish into different size ranges of fish. Displacement weighing tanks are included to enable the weight and number of fish in a selected size range to be determined.

9 Claims, 3 Drawing Figures

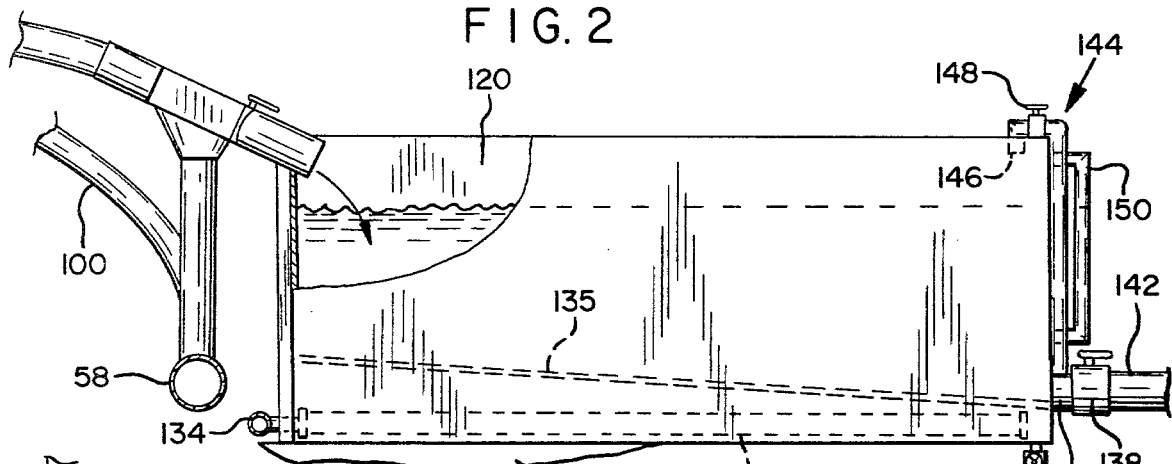
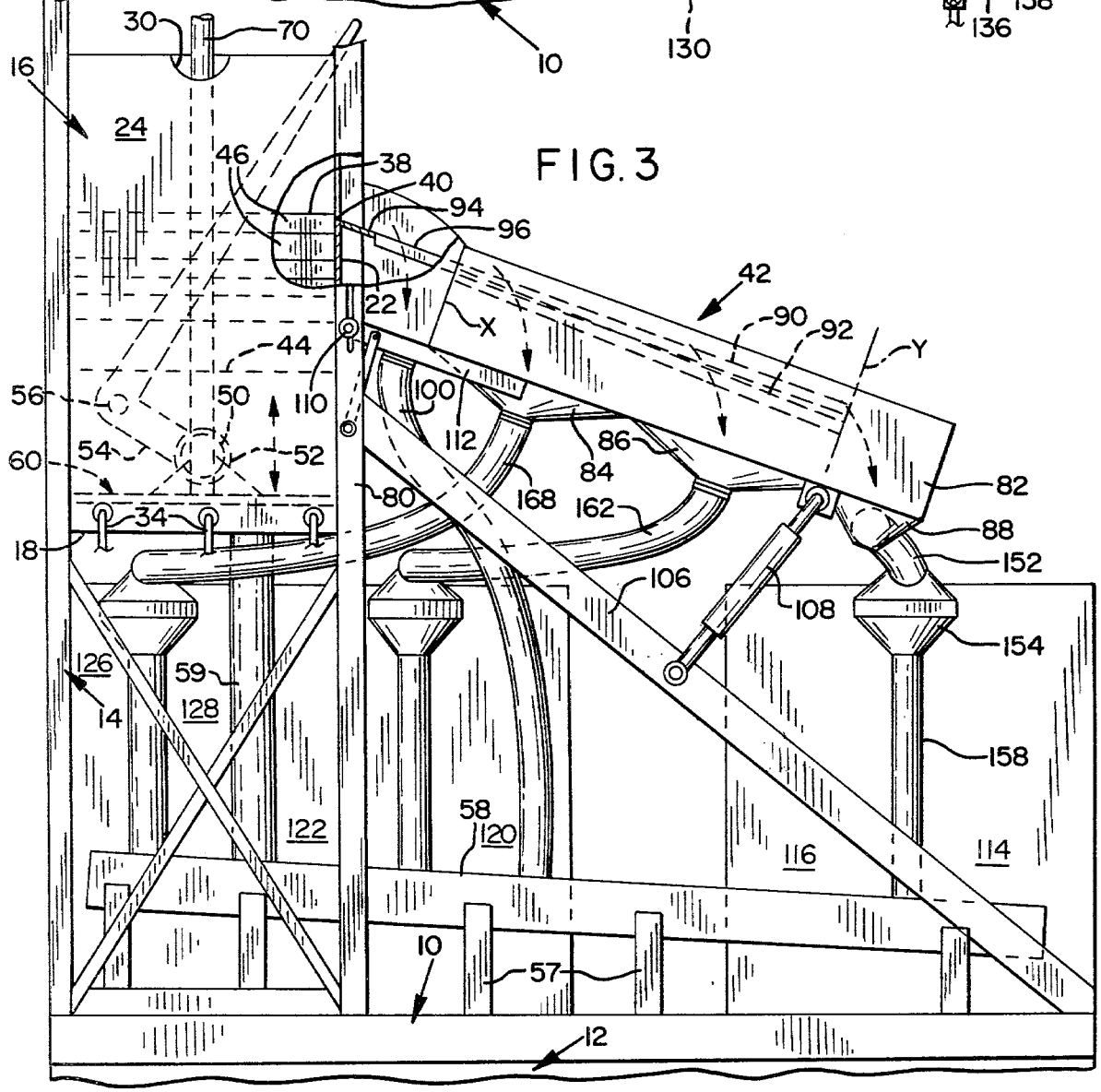

APPARATUS FOR ANALYZING A FISH POPULATION

This invention relates to apparatus for analyzing a fish population, such as the population found in a rearing pond of a hatchery. More particularly, the invention concerns apparatus of this description which may be utilized to separate the fish in a population of fish into fish of different sizes, and then to weight the fish in each separated size group.

The artificial propagation and rearing of fish is an industry which has grown considerably in recent years. With the world's conventional food supplies dwindling, many people forecast even greater growth in the future.

The running of a successful hatchery operation is dependent upon a number of factors, one of the more important being having an accurate inventory of the number and size of fish in a pond. This is so because basic information utilized in controlling conditions to produce optimum fish growth and maximum efficiency of food use is based on having an accurate knowledge of the size and number of fish in a pond. For instance, proper feeding rate, proper selection of feed pellet size, proper flow rate of water through the pond, proper fish density in a pond, etc., are all dependent on having an accurate pond inventory.

At present, the usual procedure in keeping track of the weight of the fish in a pond is initially to weigh all the fish in the pond. A sample of fish having a known weight is then taken and the number of fish in this sample determined. From this the total number of fish in the pond is calculated. At some later date, when it is desired to determine the weight of fish in the pond, such is determined by again taking a known weight sample of fish and determining the number of fish in the weight sample. The average weight of the fish is then calculated and multiplying this average weight by the number of fish earlier calculated to be in the pond produces an estimate of the total weight of fish at such later date. This procedure, however, is subject to a number of deficiencies making for inaccuracies in calculating fish weight. For instance, if there is a wide size variation in the fish being analyzed, it is easily possible to obtain a sample of fish from which a count of fish per pound is made which does not truly reflect the make up of the fish in the pond. For example, if a pond, in fact, contains an average of twenty-five fish per pound, and a count is made indicating thirty fish per pound, calculating pounds of fish in the pond from the previously determined total number of fish yields a pound figure which is well below the actual pounds of fish in the pond. From this a feeding rate, using an established formula, would be calculated which would be below that which should actually be used. With fish being provided a short ration, size variation enlarges and cannibalism increases. If the count is biased in favor of larger fish, overfeeding results, meaning wasted food and higher operational costs. Another basis for error, using the system conventionally employed, is that the originally calculated number of fish in the pond does not, as a practical matter, remain constant, as fish will be removed from the pond by predators, etc. The extent of such change in a fish population is not immediately apparent and will vary from one pond to another.

In the grading or sorting of fish, fish may be delivered to a grader which functions to separate such fish into fish of different sizes as the fish pass along the length of the grader, with typically smaller fish passing through the grader initially and larger fish passing through the grader in zones spaced downstream from where the smaller fish separate. Such a grader operates properly only if fish are delivered to it at a uniform rate and without overcrowding of the fish. Furthermore, the fish should be in good condition and not weak and limp by reason of oxygen depletion. In this connection, it should be remembered that when fish are crowded into a confined zone or region, which typically is a preliminary of grading fish using conventional techniques, the fish become excited causing the oxygen consumption of the fish to increase substantially.

Generally, an object of this invention is to provide apparatus usable in obtaining an accurate inventory of the fish in a pond or other location, which takes care of the general problems encountered in the past in making a fish count, in a highly practical and satisfactory manner.

More specifically, the invention contemplates apparatus for analyzing a fish population which includes fish-grading means operable to sort fish and separate such according to different sizes, and means for collecting fish prior to their delivery to the grading means, which may be operated in conjunction with the grading means to produce a uniform delivery of fish to the grading means, thus to promote an accurate count or sort.

A related object is to provide such apparatus wherein the means for collecting the fish includes a tank for holding the water which the fish when the fish are collected, and means for oxygenating the water within such tank to minimize oxygen depletion of the fish prior to being graded.

A further object is to provide such apparatus in the form of a mobile unit, which is adapted to be moved to a fish rearing pond and which then may be operated to determine speedily and accurately the size distribution of the fish in the pond and the total number of fish in the pond.

As part of the elements in the unit, the apparatus may comprise an elevated tank for holding a volume of water which functions as a fish-collecting tank, and fish-grading means for sorting fish and separating them according to size, with fish moving by gravity from the fish-collecting tank to the fish-grading means. Further provided in the unit may be displacement weighing tanks, with means whereby fish move under the influence of gravity from grading means into the displacement weighing tanks. A displacement weighing tank provides a means for determining, by the displacement water within the tank, the weight of fish which has been introduced into the tank.

Yet a further object of the invention is the provision of a novel collecting system for collecting fish after transfer from a rearing pond, which includes means for regulating the concentration of fish in a zone of said collecting system where fish discharge into a grader. More specifically, such may comprise a water-pervious fish barrier which is adjustable in position within a storage tank, and which is operable when adjusted in position to concentrate fish in a given zone within the tank.

These and other object and advantages are obtained by the invention, which is described hereinbelow in conjunction with the accompanying drawings, wherein:

FIG. 2 is a side elevation view, approximately along the line 2—2 in FIG. 1, illustrating further details of a displacement weighing tank and associated structure; and FIG. 3 is an end elevation of apparatus shown in FIG. 1, viewing the left end of the apparatus as such is illustrated in FIG. 1.

Figure 1:
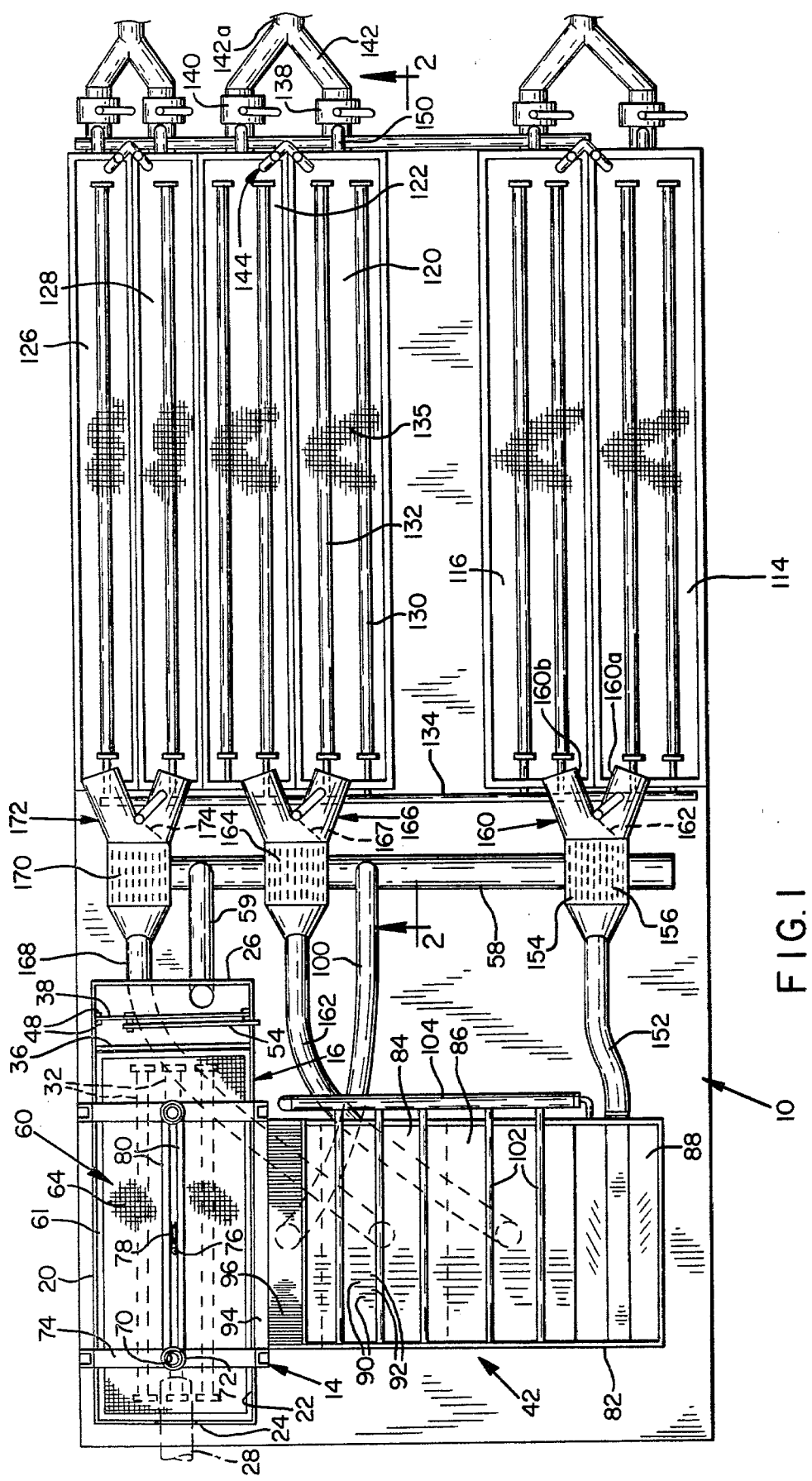
FIG. 1 is a top plane view of apparatus as contemplated according to a preferred embodiment of the invention, illustrating at the upper left-hand portion of the drawing a fish-collecting tank, downwardly from this tank in the drawing a fish grader, and to the right of the tank and grader a plurality of displacement weighing tanks, all such being mounted on a mobile frame.

Referring now to the drawings, the apparatus contemplated preferably is a mobile unit, whereby the same may be moved adjacent a pond and then used in a rapid and efficient manner to obtain an accurate inventory of the fish within the pond. The fish, after processing, may then be returned to the pond from whence they originally came, or be diverted to other ponds or impoundments of water. With the apparatus being mobile, and accommodating rapid counting, it is possible more frequently to obtain inventories of fish thus to maintain a more accurate scheduling of the feed rate, type of feed, water conditions, etc. which best suits the fish being reared in a given pond.

Thus, the apparatus illustrated comprises a suitable supporting frame 10, and beneath the frame the bed of a wheel-supported trailer, particularly shown at 12 (FIG. 3). With reference to FIGS. 1 and 3, supported as by framework 14, in an elevated position above frame 10, is a fish-holding or collecting tank, given the reference numeral 16. The collecting tank has a substantially box-like configuration, and includes a floor 18, side walls 20, 22, and end walls 24, 26. The side and end walls are suitably secured to each other, and to the floor, in watertight relation, whereby to enable the tank to hold a volume of water introduced thereinto.

Fish which are to be processed are introduced into tank 16 by a conventional fish-handling pump which has its intake connecting with the pond holding the fish. A conduit, portions of which are shown in dashed outline in FIG. 1 at 28, and which may rest within arcuate notch 30 provided in end wall 24 (see FIG. 3) connects the discharge of the pump with the tank. With operation of the pump, water together with fish born therein move from the pond to the tank.

The collecting tank is provided since it is difficult with a pump to provide an even flow of fish to any fish grader or sorter provided to separate fish into fish of different sizes. Fish are usually crowded to one end of a pond prior to being removed therefrom, and tend to move with each other so that the supply of fish from a pond produced solely by a pump is sporadic, with large numbers of fish being supplied interspersed with periods where relatively little fish are supplied. The tank, therefore, provides in effect a surge system, which evens out the flow of fish through the processing system provided downstream from the tank.

The oxygen consumption of fish increases when they are handled or excited, and thus it is important that means be provided for fully oxygenating any water within tank 16. To these ends, elongate carborundum tubes shown at 32 (FIG. 1) are provided. The walls of these tubes are porous, whereby oxygen introduced under pressure to the tube interiors escapes through these pores to form tiny bubbles which then move upwardly in the water contained within the tank. Oxygen may be supplied to these tubes by pipes 34 (FIG. 3) which connect with a tank of oxygen which conveniently may be placed on frame 10 of the equipment and located under the tank, but which has been omitted from the drawings whereby other details of construction are better illustrated.

Extending transversely across tank 16 adjacent end wall 26 in FIG. 1 is an upright screen 36 which serves to confine fish to that part of the tank located to the left of the screen in FIG. 1, but permits the passage of water to the right of the screen. To the right of screen 36 is an upright dam board structure 38. As seen in FIG. 3, fish leave the tank while carried on a thin sheet of water traveling over edge 40 defined by side wall 22, thence to travel to a fish grader or sorter, indicated generally at 42. The outlet provided by edge 40 constitutes fish-passage means connecting the tank and grader 42. The purpose of the dam board structure is to permit control of the amount of water flowing over edge 40.

As can be seen in FIG. 3, the dam board structure includes a lower fixed board 44 and resting on this board plural replaceable boards 46. Referring to FIG. 1, these replaceable boards may have their ends mounted as by seating them between guide flanges 48 secured to the sides of the tank. Board 44 is provided with a valve opening at 50 (see FIG. 3), and valve closure 52 mounted on a lever 54 pivoted on board 44 at 56 is adjustable by operation of the lever to open up opening 50 to various extents. When operating the apparatus as earlier explained, fish and water are pumped into the tank. Opening 50 is opened to the extent necessary to maintain a flow of water passing out of the tank over edge 40 as a thin stream, with the level of water in the tank only slightly below the top of the dam board structure.

Suitably supported as by brackets 57 (FIG. 3), at a substantially lower elevation than that of tank 10, is a drain conduit 58. A conduit 59 extending from the bottom of tank 16, in that region of the tank which is to the right of the dam board structure in FIG. 1, connects with the drain conduit, thus to provide a path for the drainage of excess water supplied to tank 16.

This invention contemplates that means be provided for regulating the concentration of fish within tank 16 adjacent edge 40 where the fish leave the tank whereby fish without crowding, and at a fairly uniform rate, pass from the collecting tank to the grader. More specifically, such comprises a horizontal screen assembly 60 including a rectangular screen frame 62 (FIG. 1) and stretched over the frame screening partially shown at 64. Edges of the screen assembly are suitably sealed to the inner surfaces of the tank walls to prevent fish from passing around the screen to the region below the screen.

The screen assembly is guided for vertical movement within the tank. Such may take a number of forms of construction. In the particular embodiment of the invention shown, the guide means provided includes elongate tubes 70 suitably anchored at their bottom ends to the screen assembly and with upper extremities guided by sleeves 72 (FIG. 1) mounted on crosspieces 74 which are part of framework 14. A cable and winch system may be provided for raising and lowering the screen assembly, as exemplified by cable 76 which is trained over a pulley 78 journalled between longitudinal frame members 80, the cable passing to a winch (not shown).

The screen described forms a false bottom or water-pervious fish barrier disposed between the top and bottom of the tank. Fish conventionally come in surges from the pump which delivers them to the tank. The fish leave the tank in a more evenly distributed pattern with the screen being raised to concentrate fish adjacent edge 40 as the population of fish within the tank decreases.

Fish grader 42, which is conventional in construction, includes an elongate, substantially box-shaped casing 82 which is open along the top. The bottom of the casing is formed by catch pans indicated at 84, 86, and 88 (FIG. 3). Within the casing, and extending from the region indicated approximately at X in FIG. 3 to the region indicated approximately at Y in this figure, are disposed two sets of grader bars, namely, a set of upper grader bars 90, and a set of lower grader bars 92.

The upper grader bars are fixedly mounted within the casing and extend in a plane which substantially parallels the casing, as indicated by the outline of grader bar 90 indicated in FIG. 3. The grader bars in the upper series are equally laterally spaced from each other and the series of bars extends from one side to the other side of the casing. As is conventional in fish graders, each bar has a substantially inverted V cross section, and as a consequence, as fish slide down the bars they tend to fall downwardly in the spacing between the bars.

The bottom grader bars also have the inverted V-shaped cross section described. These bars are also laterally spaced, each bottom bar extending in a zone which is intermediate two upper grader bars which are disposed above it. As can be seen with reference to FIG. 3 and the outline of a lower grader bar 92 depicted, the series of lower grader bars occupy a plane which diverges from the plane of the upper grader bars progressing from the feed ends of the grader bars, which are adjacent region X, to the discharge ends, which are adjacent region Y. It is usual to provide some adjustability in the position of the lower grader bars, whereby to enable change to be made in this amount of divergence. Because of this divergence, there is greater and greater clearance between the upper and lower grader bars progressing toward the discharge end of the grader.

A fish grader similar to one described is available commercially as the Morton Fish Grader by Neilsen, produced by Metal Industries, Inc. of Salem, Oreg., and details of such grader are set forth in their brochure number 50900.

By the construction described, it should be obvious that small fish move through the grader bars adjacent the top of the grader to fall into catch pan 84. Intermediate size fish advance farther down the grader to fall into catch pan 86. Large fish move beyond the grader bars to fall into catch pan 88.

Fish, on moving over edge 40, move over an apron 94, and thence over a dewatering screen 96, as best shown in FIG. 1. The region of casing 82 beneath the dewatering screen is connected to drain conduit 58 by a conduit 100 whereby water passing through the dewatering screen flows into the drain conduit.

Indicated at 102 (FIG. 1) are a series of spray pipes extending transversely of the sorter casing adjacent the top thereof. Such are supplied water through a manifold 104. Water sprayed from the spray pipes lubricates the grader bars earlier described to facilitate movement of the fish along the length of the grader.

The grader is supported in the apparatus through beams exemplified by beam 106 (FIG. 3) secured at one set of ends to frame members 80 of frame 14 and at their opposite set of ends to the main frame 10. The grader is mounted on these beams through struts, such as strut 108, and anchor fastening 110.

If desired, a vibrator may be added to the underside of the fish grader which facilitates movement of the fish downwardly along the upper and lower grading bars. Thus, as illustrated in FIG. 3, adjacent the feed end of the grader is a vibrator 112.

Referring to FIG. 1, the apparatus illustrated is provided with three pairs of displacement weighing tanks, one pair comprising tanks 114, 116, another pair comprising tanks 120, 122, and another pair comprising tanks 126, 128. The respective tanks are similar in construction so only one will be described in detail, which is tank 120 shown in side elevation in FIG. 2.

Each displacement weighing tank is provided along the base thereof with elongate carborundum tubes such as those shown at 130, 132. These tubes, like tubes 32 earlier discussed, have porous walls whereby oxygen introduced under pressure to the tube interiors passes through the tube walls to bubble into the water contained in the tank and oxygenated the water. The tubes are supplied oxygen through supply pipe 134.

Above the tubes is an elongate screen 135 which is set at an angle whereby such inclines downwardly toward an outlet 136 for the tank.

Considering a pair of displacement weighing tanks, more specifically, tanks 120, 122, the outlets of the pair of tanks are connected through knife gate valves 138, 140 to a "Y" connector 142 including a common conduit section 142a. Through this common conduit section fish contained in either tank of the pair of tanks may be returned to the rearing pond.

Further describing a pair of tanks, water to fill a tank is supplied through water supply system 144 including an outlet, such as outlet 146 for each tank controlled by a valve 148.

Referring to FIG. 2, each tank is provided with a displacement gauge 150 which includes a transparent portion enabling a person looking at the gauge to determine the level of water in the tank. A conventional calibration plate (not shown) may be mounted adjacent the gauge. This plate may be calibrated, for instance, to indicate, for a given amount of change in the height of the water in the tank, the weight of water displaced to produce this change in height.

Catch pan 88 which receives the large fish moving off the end of the grader bars is connected by conduit 152 to housing structure 154 mounting a dewatering screen 156. Fish and water moving from the catch basin move down conduit 152 and thence over the dewatering screen, with water then draining downwardly from the screen and flowing through conduit 158 to drain conduit 58. Fish moving beyond the dewatering screen move into a "Y" section 160 of conduit controlled by a flipper valve 162, which in one position closes leg 160a of the "Y" conduit and in another position closes leg 160b of the "Y" conduit. Depending upon the placement of the flipper valve, it should be apparent that fish moving through the "Y" conduit are deposited into either one or the other of the displacement weighing tanks 114, 116.

A similar conduit system is provided for catch basins 84, 86. Thus, conduit 162 connecting with catch basin 86 transfers water and fish into a housing structure provided with a dewatering screen 164, with fish traveling beyond this dewatering screen moving into "Y" section 166 controlled by valve 167. Conduit 168 connects catch basin 84 with housing structure including a dewatering screen 170, with fish moving over this dewatering screen moving into "Y" section 172 equipped with valve 174.

Suitable catwalk structure is provided to enable an operator of the apparatus to make adjustments in the screen assembly 60 whereby to control the concentration of fish moving into the grader, and to make proper adjustments in the various valves which control the flow of fish in the apparatus.

It will be noted that the entire system is a gravity flow system, with fish and water moving from the elevated collecting tank 16 by gravity into the grader, and with fish and water moving from the respective catch pans of the grader by gravity to be directed to the various dewatering screens described. Water removed at these dewatering screens flows by gravity into the drain conduit. Fish travelling across the dewatering screens move by gravity into selected ones of the displacement weighing tanks.

Explaining how the apparatus described may be utilized in making an inventory of the fish in a pond, fish and water are pumped from the pond into the collecting tank. The level of water in the collecting tank is controlled utilizing valve closure 52. A thin stream of water together with fish in a regulated flow produced by adjustment of the screen assembly flows from the collecting tank into fish grader 42. Fish of relatively small size collect in catch pan 84 thence to be directed into one of the pair of displacement weighing tanks 126, 128. Fish of a somewhat larger size separated by the grader are directed into one of the two displacement weighing tanks 120, 122. Fish of largest size are directed into one of the displacement weighing tanks 114, 116.

Two displacement weighing tanks are provided for each size of fish whereby one may be utilized to collect fish being processed, while the other tank is being emptied of fish and prepared for the reception of more fish. In utilizing a pair of displacement weighing tank, and considering the pair of tanks 120, 122, a tank, such as tank 120, is first filled with water to a predetermined level. Fish are then directed into the tank until the tank has received its full complement of fish. During this time the other tank, such as tank 122 is filled with water to a predetermined level to prepare it for the reception of fish when the first tank has received its complement of fish.

After tank 120 has received its complement of fish, valve 167 is adjusted to direct fish to tank 122. The operation of the apparatus takes a sample of the fish in tank 120, and it will be assumed that the sample indicates a fish size of 20 fish per pound. When tank 120 has received its full complement of fish, the calibration gauge associated with the tank is checked, and from the amount that the water level within the tank has been raised by the addition of the fish to the tank, the pounds of water displaced by the fish is determined. Knowing that 1.02 lbs. of fish equals 1 lb. of water, it is then possible to determine the pounds of fish introduced into the tank. Knowing the number of fish per pound, it is possible to determine the actual number of fish that have been introduced.

With fish diverted to tank 122, valve 138 for tank 120 is opened, to permit water and fish to leave the tank and be returned, for instance, to the pond from which they originally came. After emptying of tank 122, valve 138 is closed, and additional water introduced to the tank through supply system 144 partially to fill the tank. The water is then cutoff, and valve 138 opened, to enable this additional water to flush straggler fish from the tank and into the line which returns them to the pond. With closure of valve 138 and water introduced into tank 120 to bring it to the desired predetermined level, the tank is readied for receiving a new complement of fish.

The pairs of displacement weighing tanks 114, 116 and 126, 128 are operated in a similar manner.

If desired, the slope of the grader may be made adjustable, as by providing struts such as strut 108 which are adjustable in length, and providing a pivot mounting at anchor fastening 110. It has been noted that with the usual grader, larger fish require less slope in the grader for efficient sorting then smaller fish.

With the entire apparatus supported on a flatbed trailer and thus mobile, it is a relatively easy matter to move the apparatus to the particular rearing pond in a hatchery where it is desired to take an inventory of the fish in the pond.

Fish move through the apparatus by gravity flow, and on leaving the apparatus may flow by gravity back to the pond or ponds where it is desired to deposit the fish.

It should be obvious that what has been described is an extremely accurate process and apparatus for taking the inventory of fish within a pond. By taking accurate inventories, all the advantages earlier described which result therefrom are obtained.

While a particular embodiment of the invention has been shown and described, it is obvious that variations and changes are possible without departing from the invention.

It is claimed and desired to secure by Letters Patent:

1. Apparatus for analyzing a fish population comprising:
    an elevated tank for holding a volume of water,
    fish-transfer means for transferring fish from a pond containing the fish population into the tank,
    fish-grading means operable to sort fish and separate such according to size,
    fish-passage means connecting the tank and fish-grading means providing a path for the passage of fish from the tank to said grading means,
    and means within said tank for regulating the concentration of fish within said tank adjacent where said fish-passage means connects with said tank.

2. The apparatus of claim 1, wherein said fish-passage means connects with said tank adjacent the top of the tank, and said regulating means comprises a water-pervious fish barrier disposed between and separating the bottom from the top of the tank which barrier is adjustable upwardly in the tank.

3. The apparatus of claim 1, which further includes means for supplying oxygen to the tank adjacent the base of the tank thus to oxygenate water within the tank.

4. The apparatus of claim 1, wherein said fish-transfer means comprises a conduit equipped with a pump operable to transfer water and fish to said tank, said fish-passage means includes a weir outlet at the tank through which water and fish leave the tank on fish passing through said grading means, and said means for regulating the concentration of fish within the tank comprises a water-pervious fish barrier disposed between and separating the bottom from the top of the tank which is adjustable upwardly in the tank.

5. The apparatus of claim 1, wherein said grading means includes multiple fish outlets, certain of said outlets accommodating the discharge from said grading means of fish having a selected size range which is different from the size range discharged from other of said outlets, and which further comprises a separate displacement weighing tank for said certain and said other outlets connected to said certain and said other outlets.

6. A mobile unit adapted to be moved to a fish-rearing pond to enable an analysis of the fish population in said pond comprising:

a wheel supported frame adapted to be moved over the ground, a fish-collecting tank supported in an elevated position on said frame having a fish outlet adjacent the top thereof, fish-grading means operable to sort fish and separate such according to size, said means having an inlet and multiple outlets disposed below said inlet, different outlets providing for the discharge of fish of different sizes from said grading means, said inlet of said grading means being located below said outlet of said collecting tank, and gravity-operated means extending from said fish outlet of said tank to the inlet of said grading means providing a path for the passage of fish from the tank to the grading means.

7. The mobile unit of claim 6, which further includes a displacement weighing tank for each outlet of said fish-grading means, and gravity-operated means extending from each outlet of said fish grading means to respective displacement weighing tanks.

8. The mobile unit of claim 7, which further includes means within said collecting tank for regulating the concentration of fish within the tank adjacent said fish outlet.

9. The mobile unit of claim 8, wherein said regulating means comprises a water-pervious fish barrier disposed between and separating the bottom from the top of the tank which barrier is adjustable upwardly within the tank.

* * * * *